Patented Aug. 10, 1954

2,686,203

UNITED STATES PATENT OFFICE 2,686,203

N-HALO-T-ALKYL CYANAMIDES

Ingenuin Hechenbleikner, Norwalk, Conn., assignor to American Cyanamid Company, New York, N. Y., a corporation of Maine No Drawing. Application March 5, 1952,
Serial No. 275,018

8 Claims. (Cl. 260—551)

The present invention relates to a new class of compounds, the N-halo-t-alkyl cyanamides, and their preparation.

The new compounds can be prepared by passing a halogen into a solution of a t-alkyl cyanamide in an inert solvent preferably containing a base also dissolved therein to absorb byproduct halogen acid. The following overall reaction takes place:

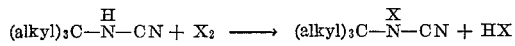

In this equation X is halogen, preferably chlorine.

The reaction of the t-alkyl cyanamides with halogen is unusual, since no practical means is known for halogenating the primary- and secondary-alkyl cyanamides. The new N-halo-t-alkyl cyanamides are useful as chemical intermediates and more particularly as selective halogenating reagents. They also have utility in the preparation of dyes, synthetic resins, ion exchange resins, pharmaceuticals, and insecticides.

The following examples illustrate without limiting the invention.

Example 1

T-butyl cyanamide (0.5 mole) was dissolved in a solution consisting of 150 ml. benzene to which 0.5 mole of pyridine had been added as HX acceptor. The solution was chilled to 10° C. and held at this temperature while 0.5 mole of chlorine was bubbled slowly into it. The result was a greenish-yellow solution containing pyridine hydrochloride in suspension. This salt was filtered and then benzene was distilled from the filtrate at 15 mm. pressure. The residue of N-chloro-t-butyl cyanamide distilled as a greenish-yellow oil at 45° C./3 mm., $N_D^{25}=1.4445$; density 1.0177. Yield, 85%.

Example 2

Following the procedure of Example 1, 0.5 mole of t-octyl cyanamide was treated with 1 mole of chlorine in 500 ml. of benzene containing 0.5 mole of pyridine. The yield of N-chloro-t-octyl cyanamide was substantially quantitative. The product was a greenish yellow liquid boiling at 55° C./0.5 mm.

The other N-chloro-t-alkyl cyanamides that can be analogously halogenated are t-amyl cyanamide, t-hexyl cyanamide, t-dodecyl cyanamide, and the like. The t-alkyl cyanamides can be made by reacting the corresponding amine with cyanogen chloride, by the general procedure of the following example.

Example 3

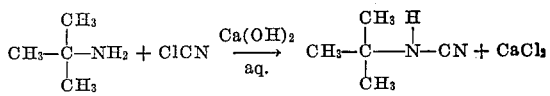

To 1 mol of trimethyl carbinyl amine dissolved in 500 cc. of water containing 0.5 mol of calcium hydroxide in suspension was added 1.0 mol of cyanogen chloride gas through a tube immersed below the surface of the fluid. The addition was continued for 2 hours with stirring while maintaining the temperature of the slurry at 5°–15° C. by means of an ice bath. The trimethyl carbinyl cyanamide was formed as a supernatant slightly discolored oil and was separated from the aqueous solution with a separatory funnel and the substantially pure product obtained by distillation at 75° C. and 0.5 mm. Yield, 76%. Trimethyl carbinyl cyanamide is a solid at the temperature of melting ice and begins to melt at 5°–10° C.

Variations in the general mode of preparing the N-halo-t-alkyl cyanamides can be employed. The ratio of reagents need not be equimolar, though such ratio is preferable. Any excess of a reagent can of course be recovered for reuse, and no minimum amount is necessary. Suitable inert solvents other than benzene include toluene, chlorobenzene, water, and others. Instead of pyridine other HX acceptors can be used including the hydroxides and carbonates of the alkali and alkaline earth metals, tertiary amines, and the like. The reaction can be carried out over a fairly wide temperature range, e. g., −5° to +20° C. and even wider. The preferred range is about 5°–10° C., however. Instead of free halogen, halogenating agents such as the alkali metal hypohalites, e. g., sodium hypochlorite, can be used.

While the invention has been described with particular reference to a specific embodiment, it is not to be understood to be limited thereby, but rather to be interpreted broadly and construed solely with reference to the appended claims.

I claim:

1. Compounds of the general formula

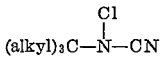

2. N-chloro-t-butyl cyanamide,

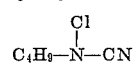

3. N-chloro-t-octyl cyanamide,

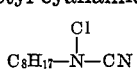

4. The method of preparing N-chloro-t-alkyl cyanamides that comprises treating a t-alkyl cyanamide with a chlorinating agent in an inert solvent, said solvent containing a halogen acid acceptor.

5. The method of preparing N-chloro-t-alkyl cyanamides that comprises subjecting a t-alkyl cyanamide to the action of chlorine in an inert solvent, said solvent containing a halogen acid acceptor.

6. The method of preparing N-chloro-t-butyl cyanamide that comprises passing chlorine into an inert solvent containing dissolved therein t-butyl cyanamide and sufficient halogen acid acceptor to neutralize byproduct HCl.

7. The method of claim 5 in which the inert solvent is benzene and the halogen acid acceptor is pyridine.

8. The method of preparing N-chloro-t-octyl cyanamide that comprises treating a solution of t-octyl cyanamide in benzene with an alkali metal hypochlorite, said treatment being conducted in the presence of pyridine, said pyridine serving to neutralize byproduct HCl, and distilling the thus formed substituted cyanamide from the resultant reaction mass.

References Cited in the file of this patent

UNITED STATES PATENTS

| Number | Name | Date |
| --- | --- | --- |
| 2,184,883 | Muskat et al. | Dec. 26, 1939 |
| 2,184,888 | Muskat et al. | Dec. 26, 1939 |
| 2,472,361 | Arsem | June 7, 1949 |
| 2,606,923 | Bortnick | Aug. 12, 1952 |